UNITED STATES PATENT OFFICE.

CHARLES L. DENISON, OF CORNING, NEW YORK.

WALL-PLASTER.

SPECIFICATION forming part of Letters Patent No. 485,177, dated November 1, 1892.

Application filed June 20, 1892. Serial No. 437,358. (No specimens.)

*To all whom it may concern:*

Be it known that I, CHARLES L. DENISON, of Corning, in the county of Steuben, in the State of New York, have invented new and useful Improvements in Wall-Plaster, of which the following, taken in connection with the accompanying drawings, is a full, clear, and exact description.

My invention relates to compositions for wall-plaster, and particularly to that class known as "quick-setting" plasters.

My object is to produce a compound which may be used as a cement when used alone or to produce a wall-plaster when mixed with dry sand and to which may be added fiber or other tissuey substance.

My invention consists in mixing and commingling together the ingredients hereinafter set forth in substantially the proportions specified, although I do not limit myself to these exact proportions, as it will be evident that they may be varied materially without departing from the spirit of my invention.

I first take one hundred pounds of plaster-of-paris or sulphate of lime, to which I add six and one-fourth ounces cotton-seed meal. This is then mixed thoroughly and allowed to stand until the meal is thoroughly permeated with the plaster-of-paris. I then add about twelve pounds of lime, (hydrate,) to which are added five hundred grains of borax and one hundred and fifty grains of cream of tartar. When these ingredients are thoroughly mixed together, I have the base of my wall-plaster, which of itself forms a very efficient cement and from which wall-plaster may be readily made by adding dry sand. This mixture forms a very hard plaster when made plastic by the addition of water.

For the purpose of making the plaster light and rendering it elastic I may add a fiber, jute, or other vegetable tissue finely ground. This also imparts an elasticity to the plaster after it is upon the wall and prevents cracking, &c.

I have found by practice and experience that the tendency of the cotton-seed meal is to act as a retarder, thereby keeping the plaster from setting too quickly, so that it may be readily worked after it has been put upon the wall, and this is further aided by the addition of the fiber or vegetable tissue, which also imparts the elasticity to the plaster.

The cream of tartar mixed with the borax serves to more readily dissolve the particles of the borax, and the borax unites with the sulphate of lime to more firmly combine and unite the particles thereof.

Having described my invention, what I claim, and desire to secure by Letters Patent, is—

The herein-described composition of matter, consisting of lime, cotton-seed meal, plaster-of-paris, borax, and cream of tartar.

In witness whereof I have hereunto set my hand this 14th day of June, 1892.

CHARLES L. DENISON.

In presence of—
  J. J. SARKE,
  E. F. BRANCH, Jr.